Feb. 21, 1967   E. A. GARDNER   3,305,113
PICKER TRANSPORTATION AND FRUIT-DELIVERY APPARATUS
Original Filed Jan. 2, 1963   11 Sheets-Sheet 1
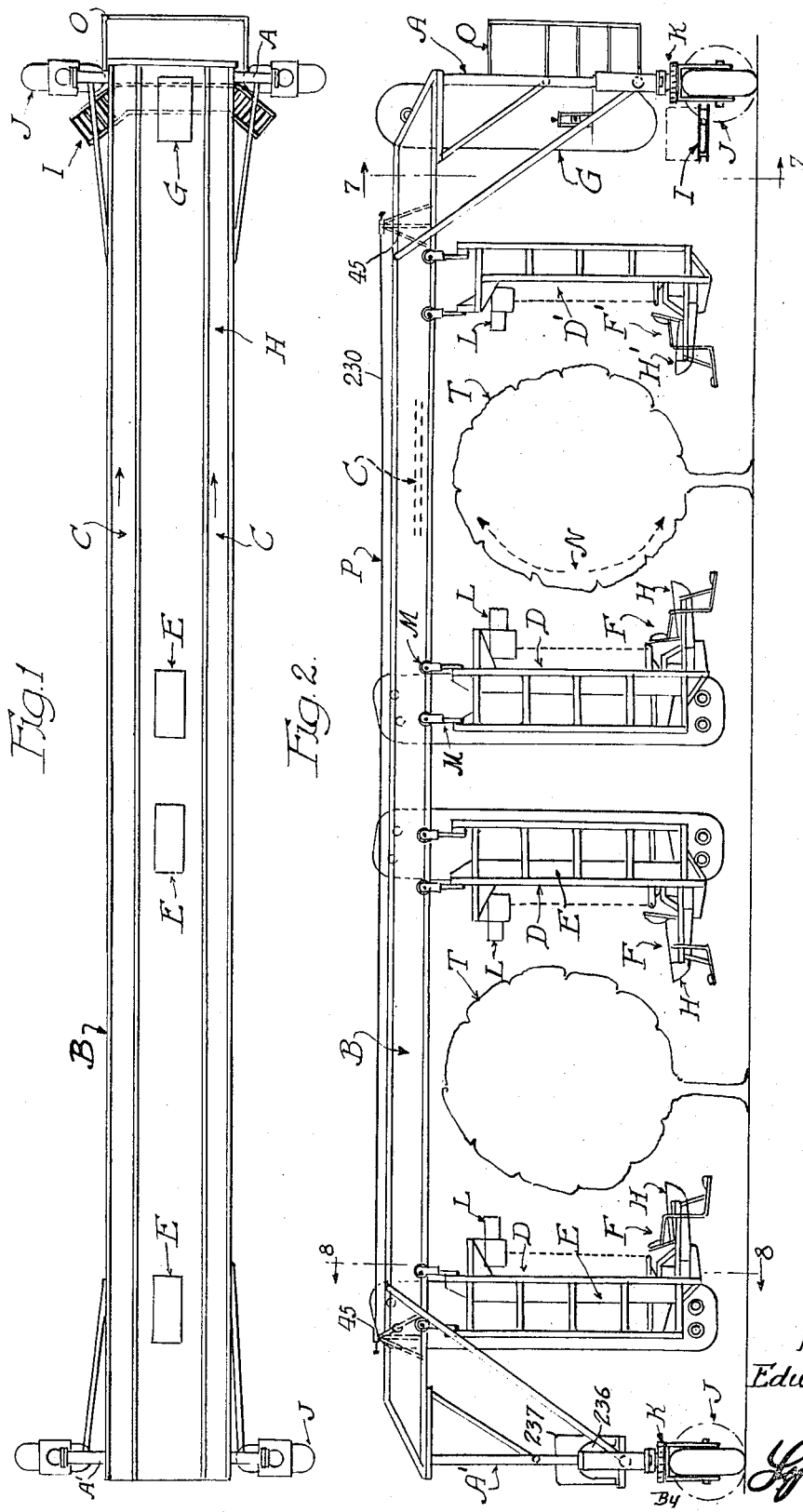
INVENTOR
Edwin A Gardner
By

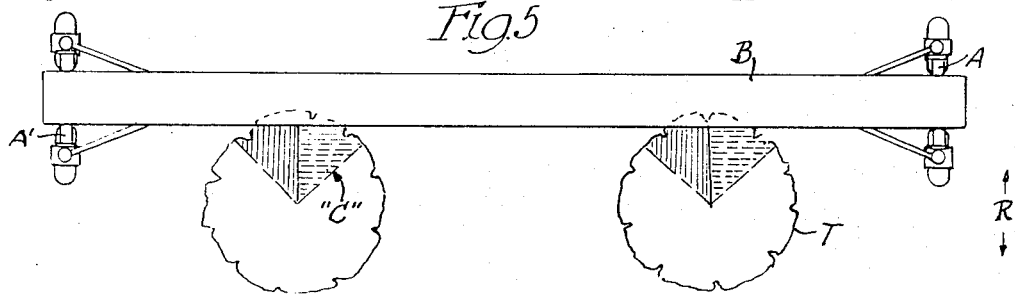
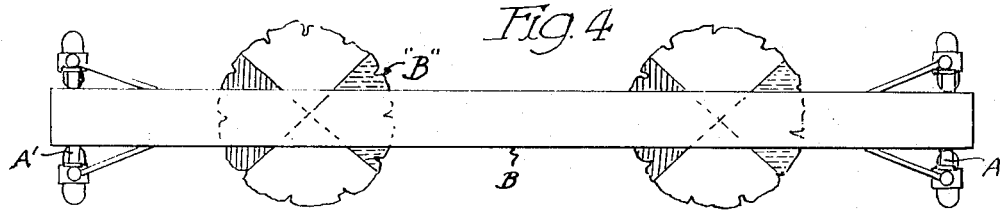
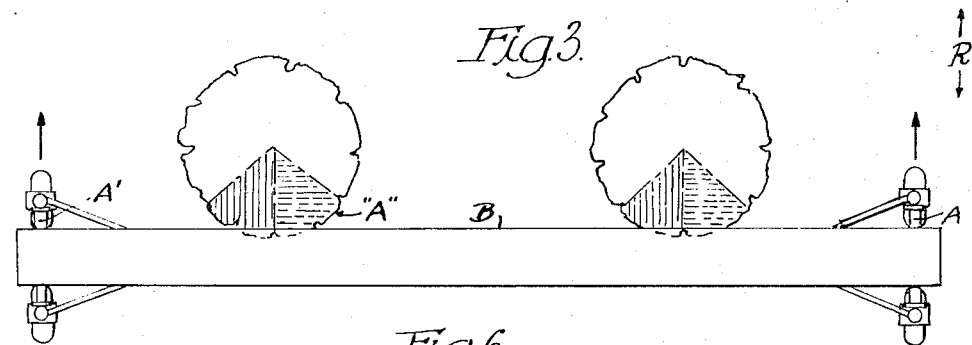
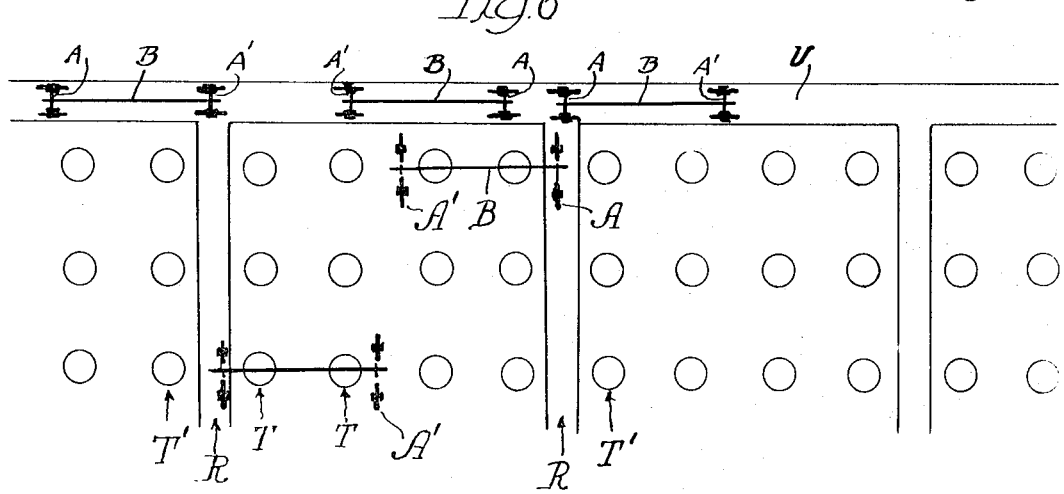
INVENTOR.
Edwin A. Gardner

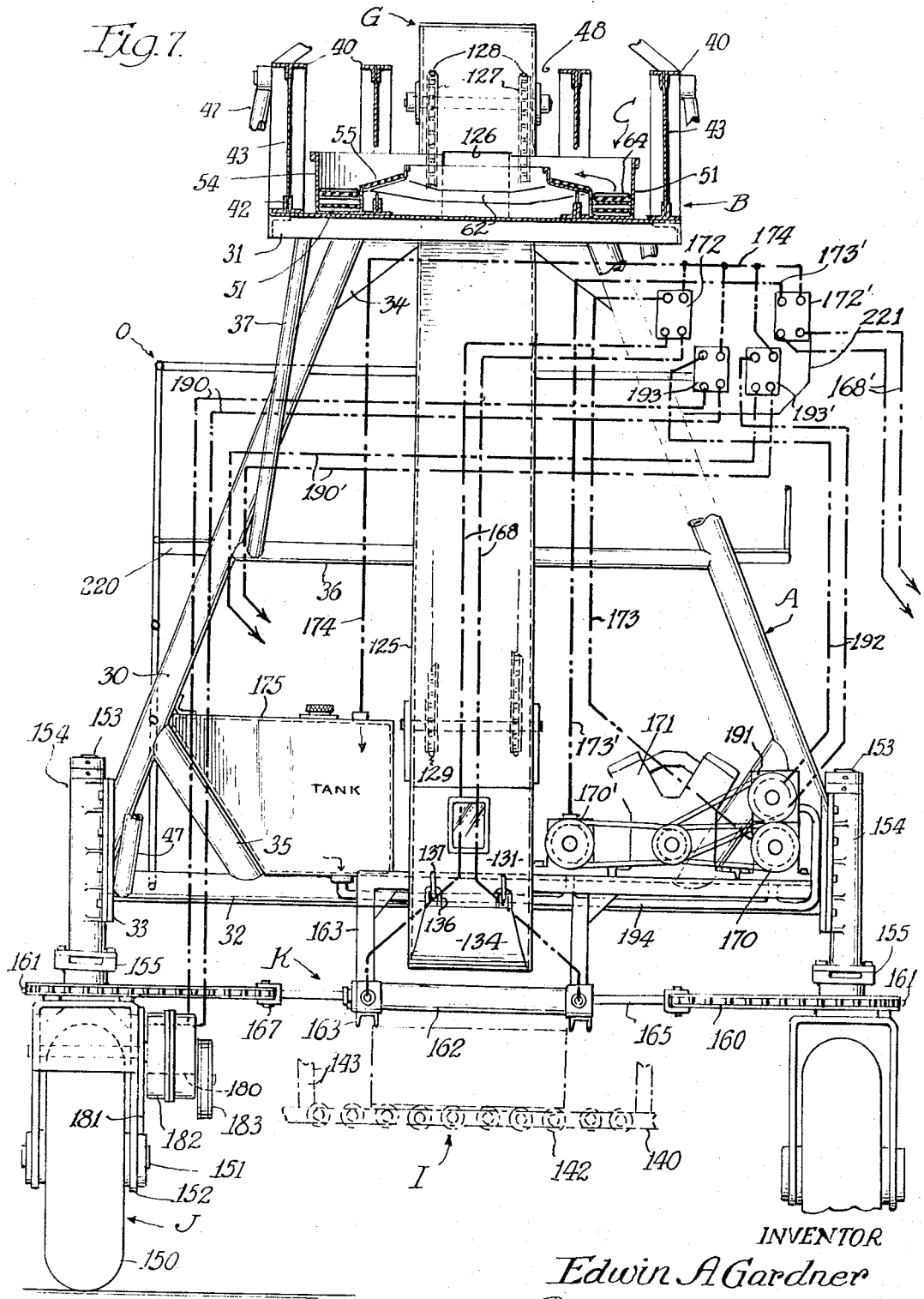

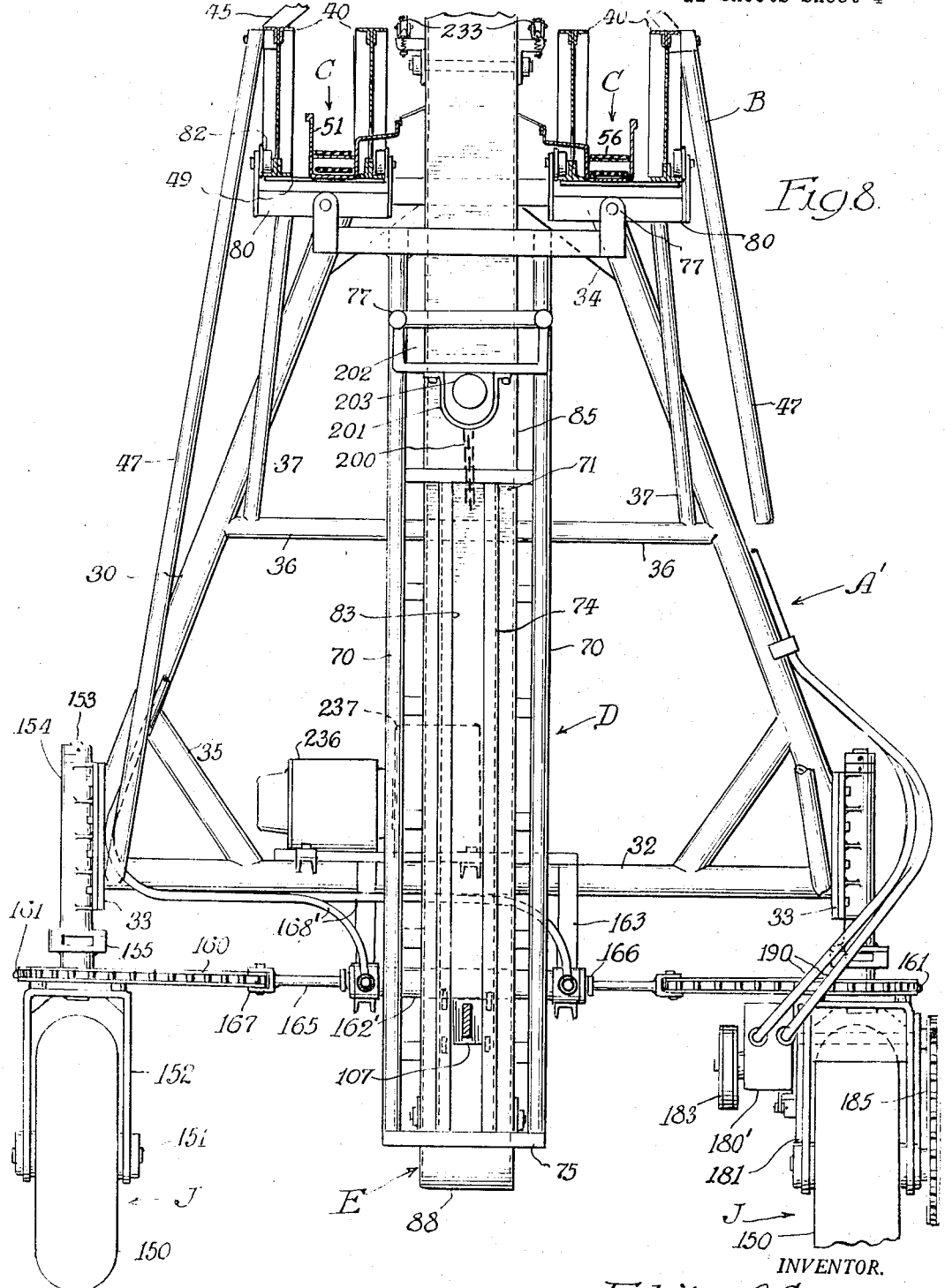

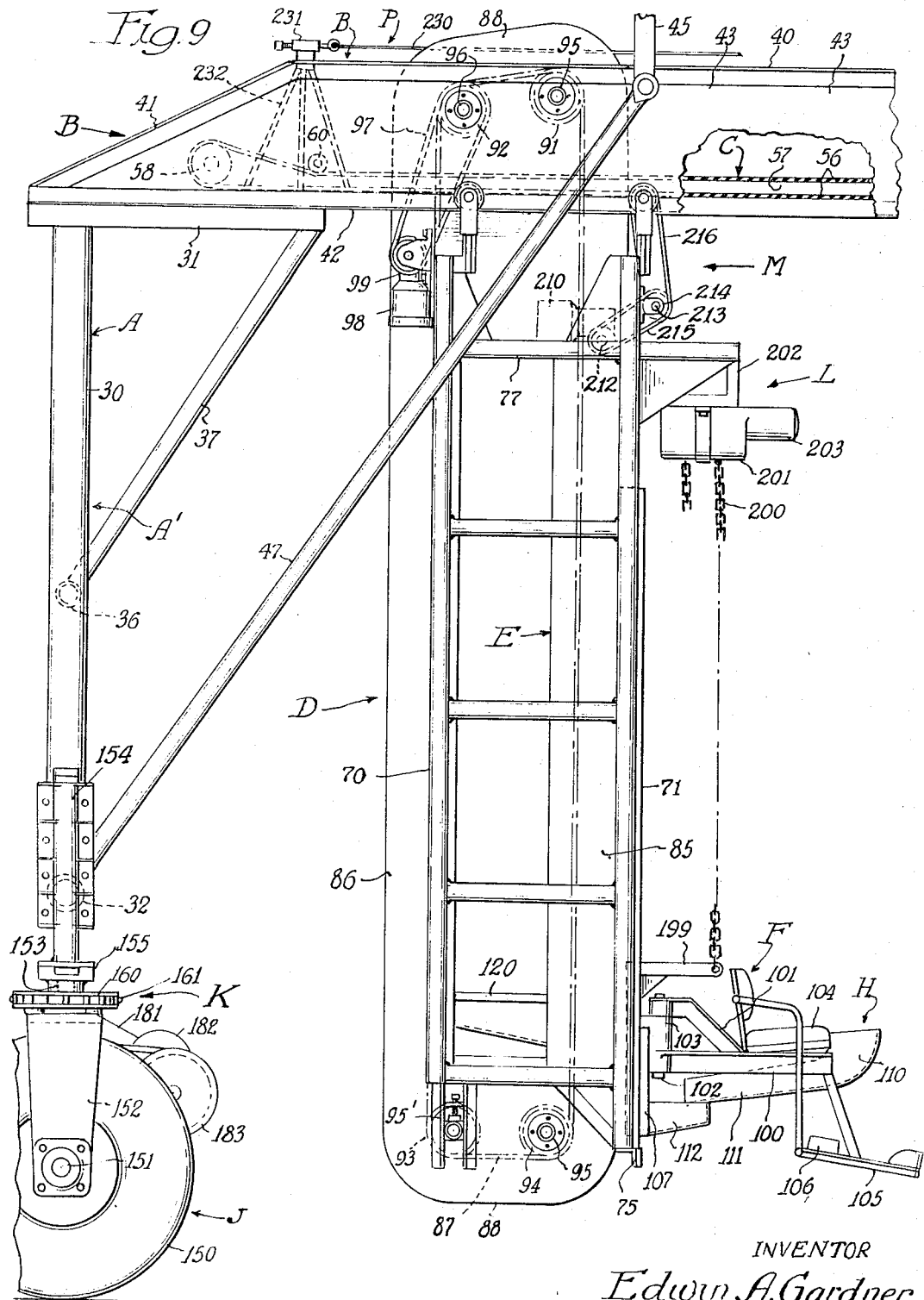

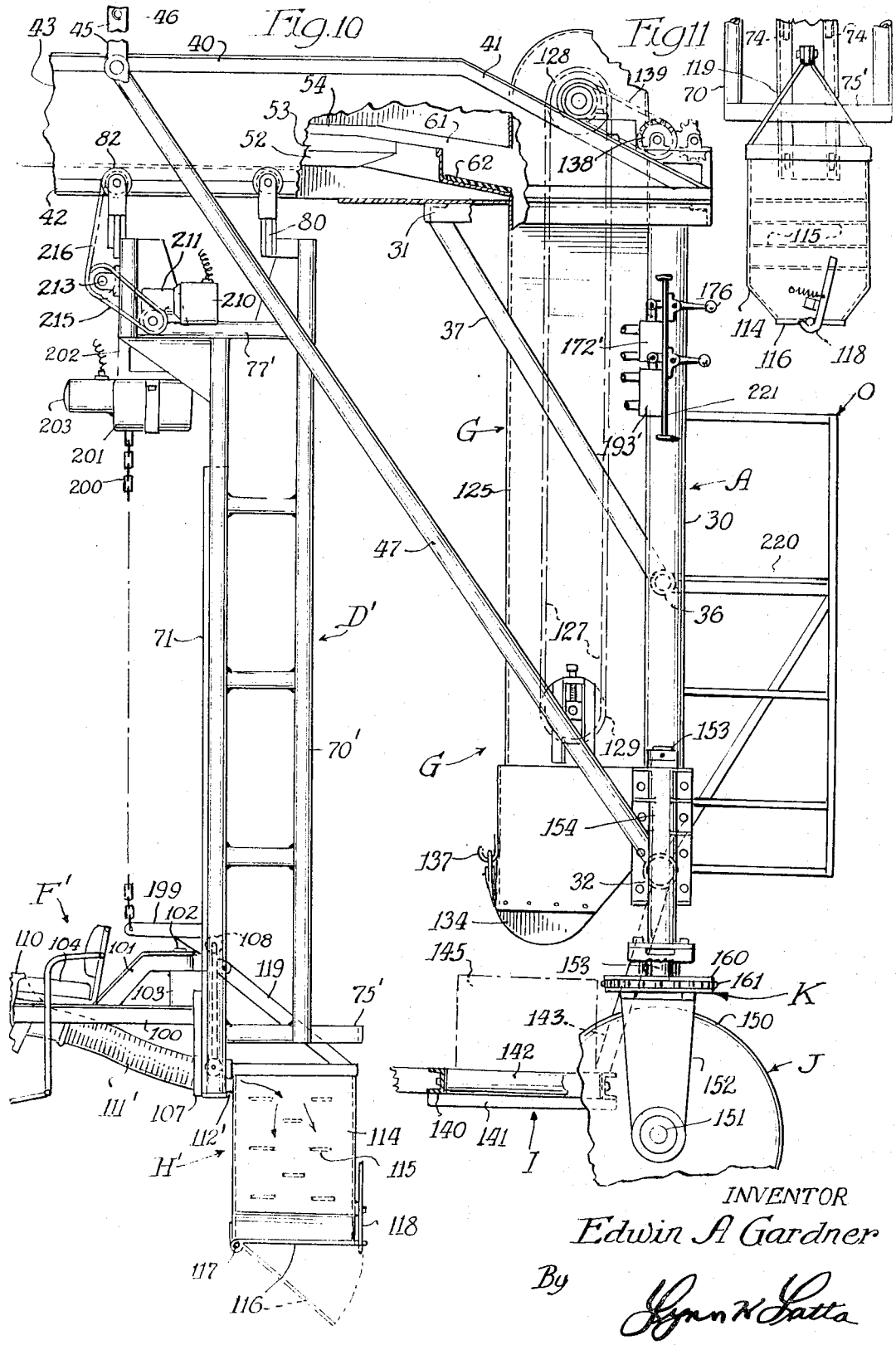

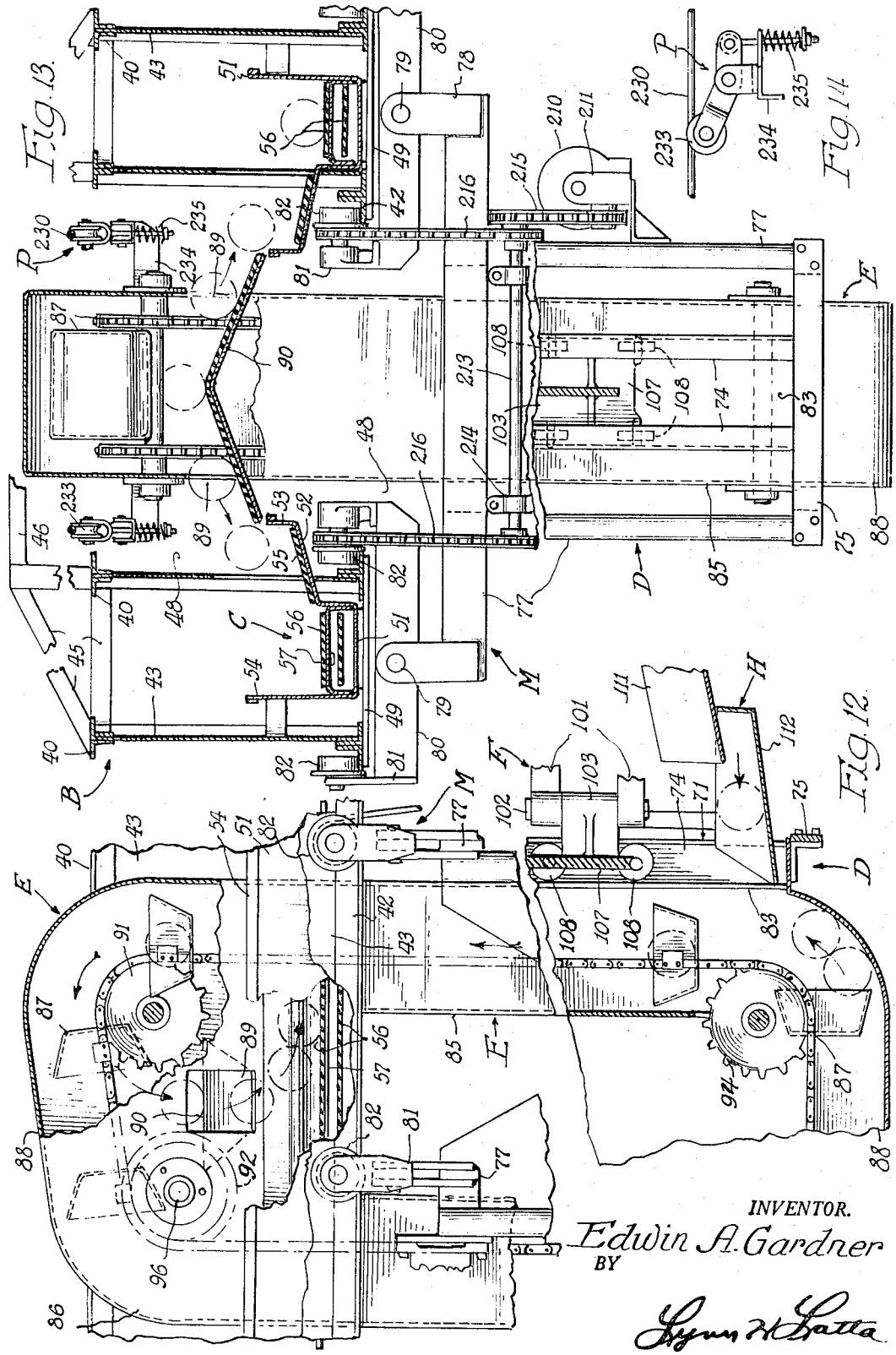

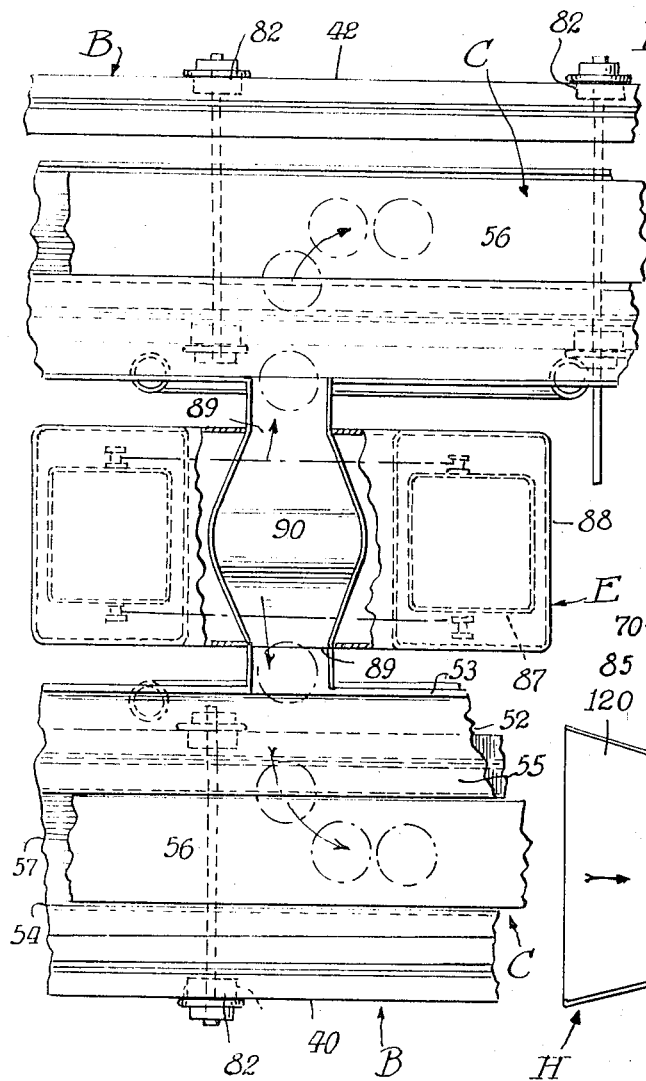

Feb. 21, 1967   E. A. GARDNER   3,305,113
PICKER TRANSPORTATION AND FRUIT-DELIVERY APPARATUS
Original Filed Jan. 2, 1963   11 Sheets-Sheet 9
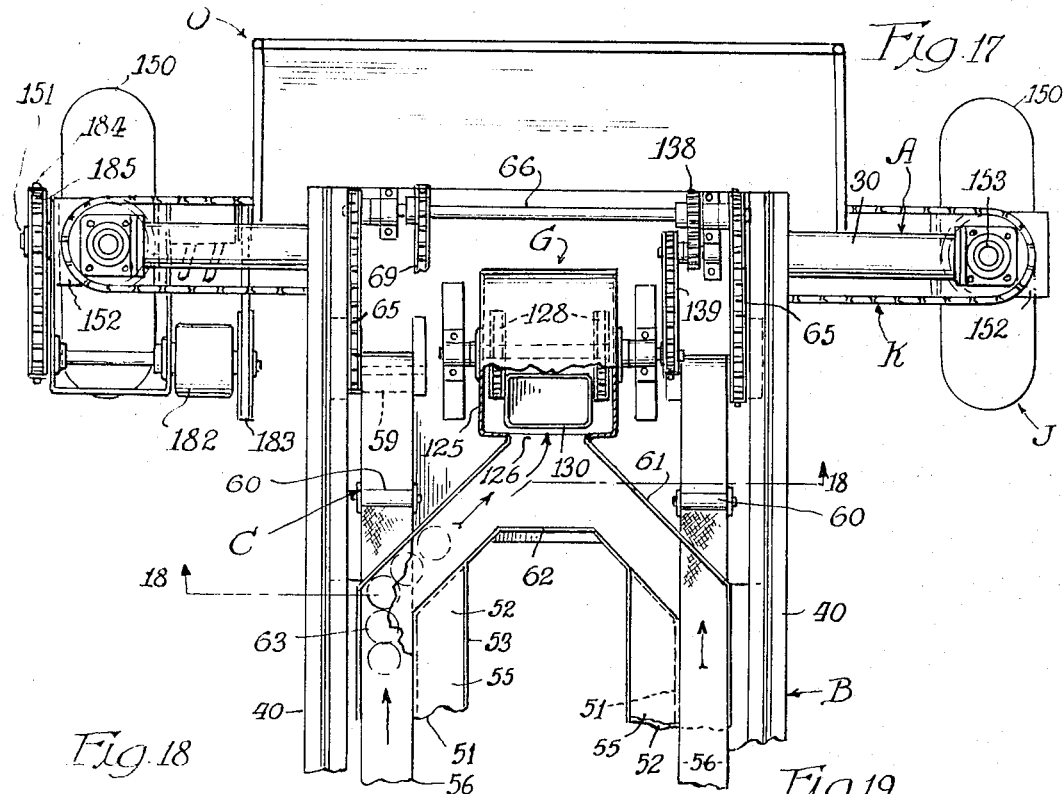
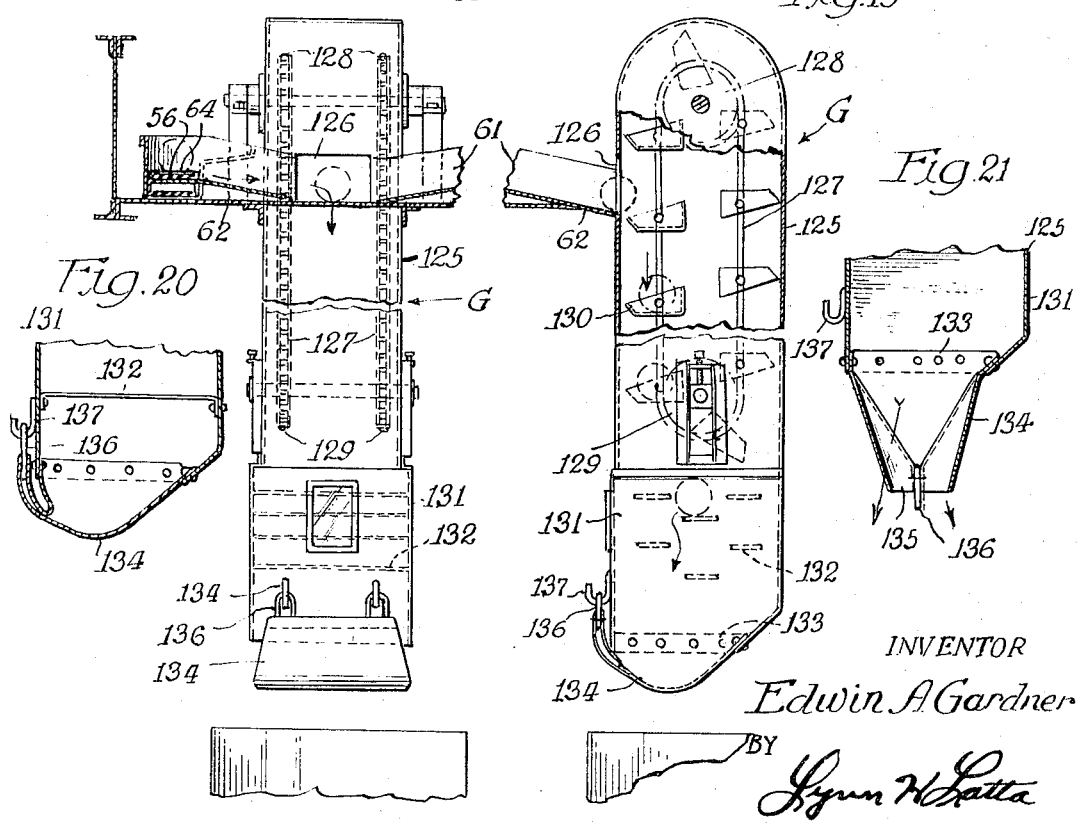
INVENTOR
Edwin A. Gardner
BY
Lynn H. Latta

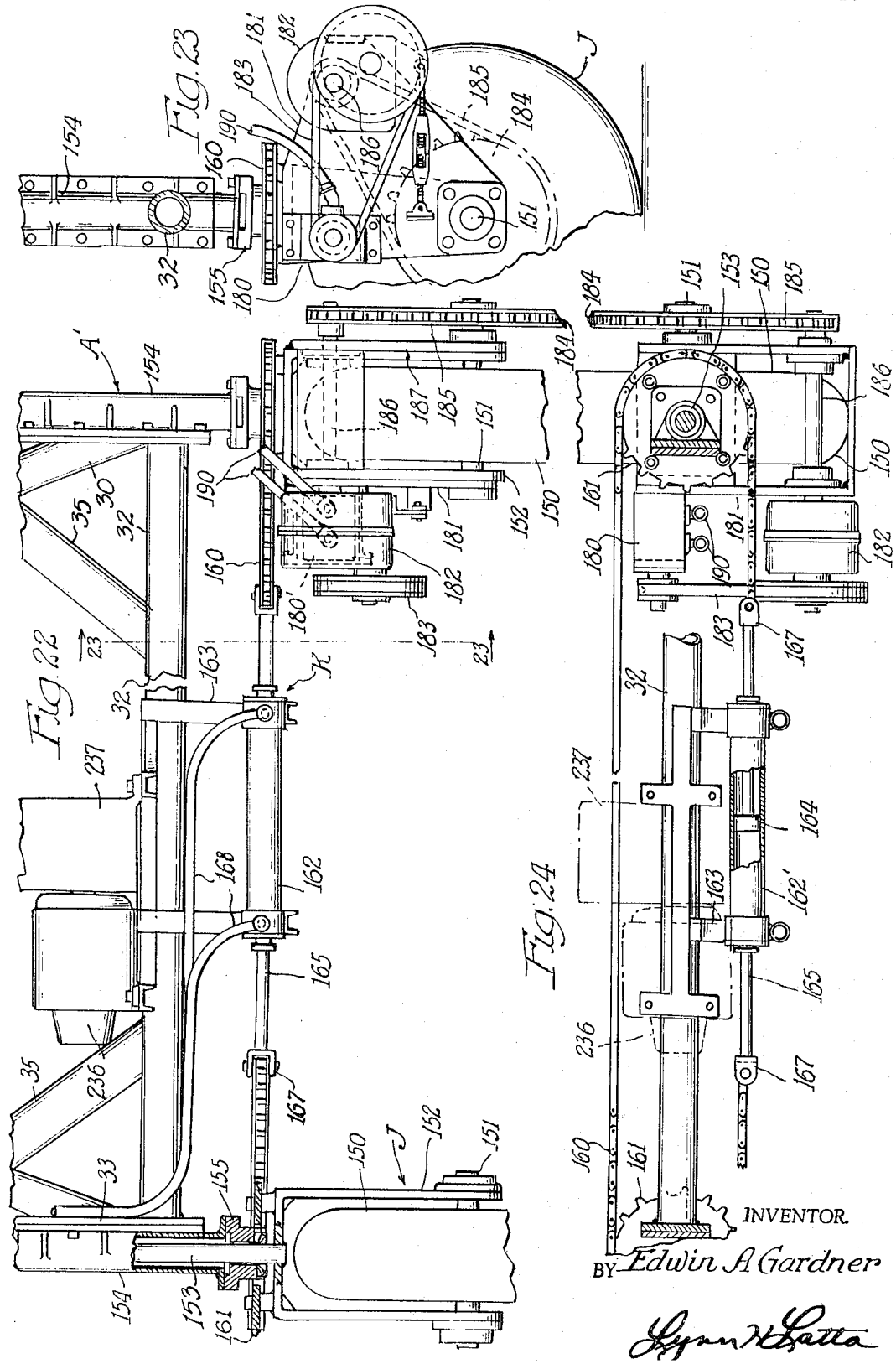

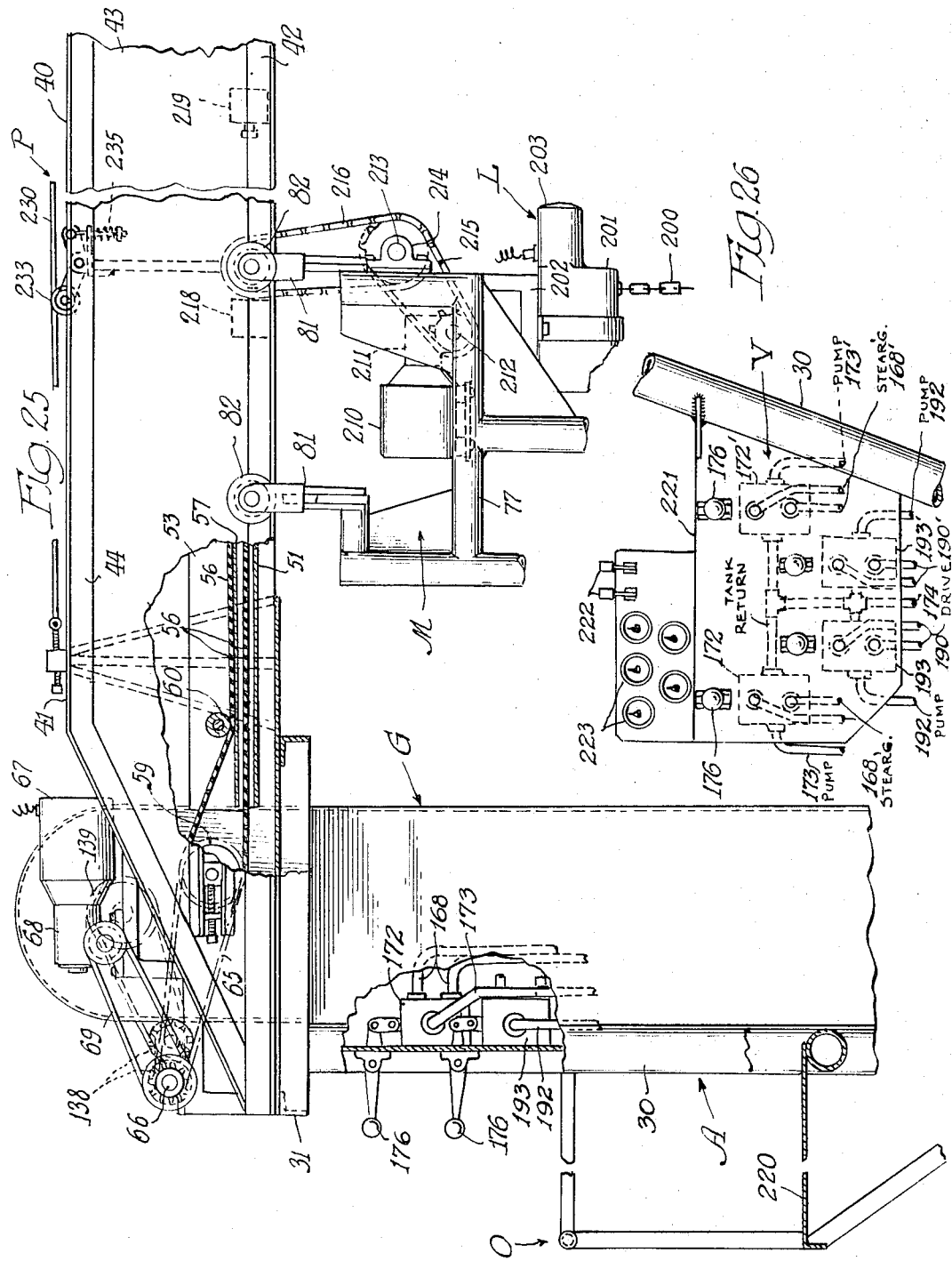

United States Patent Office 3,305,113
Patented Feb. 21, 1967

3,305,113
PICKER TRANSPORTATION AND
FRUIT-DELIVERY APPARATUS
Edwin A. Gardner, Ventura, Calif., assignor, by direct and mesne assignments, to Esengee Harvester Corporation, Van Nuys, Calif., a corporation of California
Continuation of application Ser. No. 249,026, Jan. 2, 1963. This application Apr. 18, 1966, Ser. No. 543,432
11 Claims. (Cl. 214—83.1)

This is a continuation of Serial No. 249,026, filed January 2, 1963, now abandoned.

This invention relates to agricultural operations in trees arranged in conventional rows in an orchard, and has as one of its objects to provide a method and apparatus for speeding up and increasing the efficiency of picking and handling fruit in an operation wherein manual picking is utilized to obtain maximum care in protecting the fruit against bruising or other damage, and wherein mechanised handling is utilized for delivering the fruit to a depositary area from which it can be transported to warehouse or market.

The invention is also applicable to pruning, spraying and other operations commonly performed manually on fruit trees, and a general object of the invention is to provide an improved motorized worker-transport apparatus providing mobile support for a plurality of workers, for various operations in and about a series of fruit trees arranged in rows.

In conventional fruit picking operations now employed in large orchards, fruit is picked manually by a crew of workers utilizing ladders for access to the upper areas of the trees, and picker's bags for receiving the fruit as it is picked. When a maximum load has been deposited in the bag, the picker must descend from the tree, walk to a "box row" in which there has been placed a plurality of boxes or bins in which the fruit is subsequently transported by truck to a warehouse or other receiving area, and he must then return to the tree being picked, reascend the ladder and continue his picking. When he has picked all of the fruit in the area that can be reached from the ladder in a given position, he must move the ladder, requiring another stage of descending and reascending movements. It has been calculated that 48 percent of the picker's time is consumed in walking from the tree to the box row and return, emptying his sack, positioning and repositioning the ladder, ascending and descending.

The primary object of the invention is to provide a method and apparatus eliminating the necessity for the use of the ladder, eliminating the slow operations of ascending and descending the ladder, and completely eliminating any necessity for the picker to move from his picking station to the box row or other delivery area.

In the conventional operation, the tree being picked may be immediately adjacent the box row or it may be one row removed therefrom. In the latter case, the round trip distance between the picking area and the box row may be as much as 40 to 50 feet, depending upon the distance between rows of trees (which are usually planted from 20 to 24 feet apart). In addition to these frequent round trips for emptying his picking sack, the picker, after having finished his picking on one tree, will have to move to a new picking area which may be as much as 200 to 300 feet away, depending on the size of the crew employed. The invention has a further object to eliminate the necessity for making this move from one picking area to another. More specifically, the invention contemplates a method of picking wherein a picking crew is slowly transported along a row (or a plurality of rows) of trees, successively picking each tree in the row until the end of the row is reached, and repeating this operation in a subsequent row or plurality of rows.

In short, the invention provides a method and apparatus by which the pickers of a crew will remain at their picking task, spending virtually all of their time and effort in continuous picking of fruit without the necessary for intervening excursions such are required in present picking operations. The operations now performed by the picker in these excursions are, in our method, performed by the apparatus at an operating cost far below the cost of paying pickers hourly wages.

A further object is to increase efficiency by lightening the labor of the picker or other tree worker, and making it more pleasant. In the use of our method and apparatus, the worker rides a "bos'n's chair" seat in which he is transported to and between all of the positions that he must assume in order to pick his share of a tree. His physical energy therefore can be entirely expended upon the picking of the fruit.

Another object is to provide a method and apparatus whereby the transportation of the tree worker to the various positions he must assume with respect to a tree, is under his own control.

A further object is to provide a method and apparatus whereby a picker, as fast he he picks the fruit, instead of placing it in a picker's bag, delivers it to a conveyor apparatus which automatically conveys it to a discharge point in the box row adjacent the row of trees (or one of the several rows of trees) being picked; and wherein the fruit is constantly cushioned against bruising from the moment it drops from the picker's hand until it is delivered into a box or bin in the box row or depositary area.

A still further object is to provide a mobile apparatus embodying a vertical fruit elevator unit combined with a vertical lift for raising and lowering a picker's bos'n's chair alongside the elevator, especially characterized by the provision for access to the elevator at all elevations in the range of vertical movement of the chair, whereby the picker may pick fruit at any elevation in said range and deliver the fruit directly to the elevator at that elevation.

The invention provides a method and apparatus whereby the trees of a row are successively picked or otherwise worked by a pair of workers provided with respective motorized seat-conveyor units which are transported in diametrically-opposed relation along opposite sides of each tree of the row in succession, with both sides of the tree being simultaneously worked by the pair of workers each operating at the same time in a corresponding sector of working area.

Other objects and advantages will become apparent in the ensuing specification and appended drawing in which:

FIG. 1 is a generalized or schematic plan view of a picking apparatus embodying the invention, the transportation wheels being shown in the position for moving the machine along the two rows of trees being picked;

FIG. 2 is a side elevation of the machine, with the transportation wheels shown, in phantom, in the positions for shifting the machine to a pair of unpicked rows of trees after having completed the picking of a pair of rows;

FIG. 3 is an orchard plan diagram illustrating the location of the machine with respect to a pair of trees of adjacent rows of an orchard in the first or "A" sector position of picking operation in which the first two sectors of the respective trees are picked by four pickers arranged in pairs on opposite sides of the respective trees;

FIG. 4 is a corresponding schematic view showing the machine moved to the middle or "B" sector picking position in which the second pair of sectors (on diametrically opposite sides of the trees) are picked in each tree;

FIG. 5 is a corresponding diagram showing the machine moved to the final or "C" sector picking position in which the last two sectors of each tree are picked, leading to the transportation of the machine and its pickers to the next pair of trees;

FIG. 6 is an orchard plan diagram illustrating the right and left paired relationship of a mated pair of picker transporting machines operating on four (two pairs of) rows of trees (with box rows between these four rows and adjacent rows) and delivering fruit to the respective box rows; and further illustrating the shifting of the machines to another similar series of four rows;

FIG. 7 is a vertical transverse sectional view showing the operator's end of the machine as indicated by the line 7—7 of FIG. 2;

FIG. 8 is a vertical sectional view of the other end of the machine, looking in the opposite direction as indicated by line 8—8 of FIG. 2;

FIG. 9 is a fragmentary elevational view of said other end of the machine;

FIG. 10 is a fragmentary elevational view of the operator end of the machine, parts being broken away and shown in section;

FIG. 11 is a detail elevational view of the picker's hopper unit of FIG. 10;

FIG. 12 is a detail break-away elevational sectional view of one of the traveling picker-elevator units;

FIG. 13 is a transverse sectional view of the bridge of the machine showing portions of the same unit in elevation;

FIG. 14 is a detail of one of the power pick-up trolley units;

FIG. 15 is a fragmentary plan view of the upper end of one of the elevator units and the associated bridge conveyor units;

FIG. 16 is a horizontal sectional view of one of the picker carriage and elevator units;

FIG. 17 is a fragmentary plan view of the operator end of the machine showing the delivery end of the bridging elevator mechanism and the associated down-conveyor;

FIG. 18 is a fragmentary sectional view of the same taken on the line 18—18 of FIG. 17, showing the down-conveyor in elevation in the background;

FIG. 19 is a side elevational view of the same showing the discharge end of the bridge conveyor in vertical longitudinal section;

FIG. 20 is a fragmentary vertical sectional view of the down-elevator, with parts broken away and with the fruit-collecting pouch closed;

FIG. 21 is a vertical sectional view of the lower end of the same, showing the fruit-collecting pouch opened to provide a discharge mouth;

FIG. 22 is a fragmentary elevational view of the back end of the machine illustrating the wheel drive and steering apparatus;

FIG. 23 is a fragmentary transverse elevational-sectional view of the same in a longitudinal plane as indicated by the line 23—23 of Fig. 22;

FIG. 24 is a plan view of the same with parts shown in horizontal section;

FIG. 25 is a fragmentary elevational view of the operator end of the machine with parts shown in longitudinal section and showing one of the picker carriage travel and hoist mechanisms; and FIG. 26 is a fragmentary elevational view of the control panel section of the operator end of the machine.

GENERAL DESCRIPTION

Referring now to the drawings in detail and in particular to FIG. 2, my invention utilizes an apparatus comprising, in general, a pair of wheel-mounted end frames, A and A' respectively; an overhead bridge beam B the respective ends of which are provided with trussed connections to the respective end frames; overhead conveyor mechanism C embodied in bridge beam B; three horizontally mobile picker carriage booms D each having a fruit elevator E embodied therein and each having a picker's carriage F and hopper unit H movably mounted thereon; a fourth picker's boom D' carrying a corresponding picker's carriage F' and hopper unit H' but having no fruit elevator; a down conveyor G associated with frame A at the operator's end of the machine, for lowering the fruit from the discharge end of overhead conveyor C; a box rack and conveyor I near the bottom of frame A; motor driven wheel units J at the lower corners of the respective end frames A and A'; and power steering units K for the respective wheel units.

Each of the carriage units F, F' is provided with power-driven lift mechanism L for elevating and lowering the carriage to the various elevations at which the picker operates in a tree. Each of the booms D, D' is provided with motor driven travel mechanism M for horizontal travel along the bridging beam B, such travel unit being controlled by the picker and providing for approaching and receding movements with reference to the tree. By a properly controlled combination of vertical and horizontal movements through the mechanisms L and M, it is possible for the picker to maneuver his chair in a vertical path conforming generally to the vertical contour of the tree in the sector being picked (e.g. as roughly indicated by the double headed arrow N in Fig. 2). Similarly, by suitably correlating the horizontal approaching and receding movements of his carriage with the progressive travel of the machine from the "A" to the "B" and thence to the "C" picking sectors (FIGS. 3–5) the picker can maneuver his carriage horizontally to correspond to the respective positions of the "A", "B" and "C" sectors of the tree.

Power for the fruit elevators E and for the carriage lift units L and boom-transport units M (all driven by respective prime movers which can be electric motors) is provided for by a power system P including a generating unit 236 of sufficient capacity, from which power is distributed through a trolley system including trolley wires carried by the bridging beam unit C above the highest level that can be reached by a picker, and through trolley followers and distribution circuits connected to the respective motors. Each picker's boom unit D, D' has its own individual electric circuit including controls which are operated by the respective pickers, for operating their carriage lifts L and their horizontal transport motor units M. Thus each picker can operate independently of the others. Elevators E and conveyors C and G are operated continuously during the operation of the machine along a pair of tree rows.

Power for overall mobile operation of the machine is furnished through a hydraulic pump and a power system which may embody hydraulic fluid distribution plumbing connecting the pump to hydraulic wheel-drive motors in the wheel units J and to hydraulic cylinders in the steering units K, the cylinders transmitting steering movement to the wheel units J through chain and sprocket transmissions. It will be understood that the power systems for steering and wheel drive can be electrical instead of hydraulic and that the power system for the conveyors, elevators, and picker carriage moving, could be hydraulic instead of electrical.

The wheel units J can be steered through 190 degrees range of steering movement. Ground-transport of the machine is controlled by a supervising operator. The supervising operator can be one of the pickers, operating controls carried on his bos'n's chair or on an overhead bridge beam of the main frame structure of the machine; or by periodically ascending to an operator's cage O where the controls can be grouped on a console panel. Alternatively, a separate supervising operator may ride the operator's cage O. The overall schedule of operation is under the control of this operator, who in turn regulates his control operation to the picking operations.

Each picker's seat is mounted to its respective lift carriage by a knuckle joint providing a vertical axis about which the seat may swing in an arcuate horizontal path. Such lateral swinging movement is effected manually by the picker, e.g. by grasping a tree branch and pulling himself to one side or the other of a median position. Thus the progress of transportation along the tree row can be varied at each picker's seat at the will of the picker by either advancing or retarding the position of his seat with respect to the position of the machine in its general course of travel along the tree row. Each seat can be swung horizontally through approximately a 160 degree arc, with a chord of five feet and with a maximum comfortable reach of seven feet by the picker within the range provided by this arc. The advancing and returning movements thus effected individually by the picker are superimposed upon the general forward advance of the machine along the row.

METHOD OF OPERATION

Referring now to FIGS. 3, 4 and 5 in addition to FIG. 2, it will be seen that the end frames A and A' and the overhead bridge beam B collectively constitute a gantry crane structure adapted to span across two rows of trees indicated at T, a box row R being provided between the row of trees T and adjacent row of trees T' (FIG. 6). The end frames A, with their down conveyors G, are disposed in the box rows R, so that boxes previously deposited in the box rows R can be placed upon the conveyor-box racks I and filled by the fruit being delivered from the lower ends of down conveyors G and when filled, lifted from the conveyor-rack I and redeposited in the box rows behind the respective machines, for pick-up by transportation truck or the like. Alternatively, a pair of machines working together can be operated with their operator's ends A both traveling in a common box row and delivering the picked fruit to the single box row.

A pair of the picker booms D are arranged in embracing relation to one row of trees T. The non-elevating picker boom D' is arranged on the side of a row of trees T adjoining the box row R, and the other elevator-picker boom D is arranged on the opposite side of that row. Fruit from the pickers operating on booms D is carried upwardly by the elevators E and delivered to the bridging conveyor C which carry the fruit, in the direction indicated by the arrows in FIG. 1, to the down conveyor G which lowers the fruit into the receiving bins or boxes. Fruit from the picker operating on unit D' is delivered directly into a receptacle from the picker's hopper H' of that unit, and is thence transferred manually to a receiving box which is deposited in the nearby box row, since there would not be sufficient saving in time or effort of this picker to justify elevating the fruit to the bridging conveyor C and thence almost immediately returning it to ground level in the down conveyor G, thereby adding to the load handled by elevators E and G and requiring them to be of larger capacity.

The motorized transport wheel units J are positioned with two wheel units of each end frame in tracking alignment as shown in FIG. 2, and as the four riding pickers pick the fruit simultaneously on opposite sides of the respective rows, the wheel units J are slowly driven, intermittently, to transport the entire machine at right angles to the longitudinal axis of bridging beam B, along the tree rows, moving slowly past a pair of trees T (e.g. in the direction indicated by the arrows in FIG. 3), in three stages of intermittent movement, placing the machine first in the position (FIG. 3) in which adjacent sectors "A" of the trees are picked by the respective pairs of pickers, then in the position (FIG. 4) in which diametrically opposite sectors "B" are picked, and finally, in the picking position in which adjacent sectors "C" are picked in the respective trees.

As the general forward advance of the machine brings the picker successively to the "A," "B" and "C" picking sectors, each picker will individually maneuver his seat-hopper unit vertically and horizontally so as to pick that sector completely before the general advance of the machine moves him to the next sector. Normally, a picker will start at a bottom position (e.g. 18 inches above ground level) and will pick upwardly, operating his horizontal travel motor unit M to cause his respective boom D or D' to recede from the tree axis as he approaches the major width of the trees and returning the boom toward the tree as he nears the top of the tree; simultaneously swinging his seat laterally about its knuckle joint to compensate for irregularities in the density of fruit encountered in the sector being picked, and thus adjusting his picking operation to the general forward travel of the machine.

Referring now to FIG. 6, the invention contemplates the operation of a pair of machines in unison, preferably in tandem, in right and left paired relationship, with the operator end A of each machine traveling in a box row R and with the opposite ends A' of the machines traveling in a parallel travel row. When a machine reaches the end of a pair of tree rows being traversed, it is moved from the ends of a box row and travel row in which its wheels are traveling, into a head road U with which the ends of the rows communicate. The travel wheels J are then pivoted through 90 degrees to positions (shown in broken lines in FIG. 2) in which the axles of each pair of wheels are aligned, thereby placing the wheels in position for travel along the head row, with the longitudinal axis (e.g. of bridging beams B) disposed in the path of travel. The machines are then moved at maximum speed to positions for spanning two pairs of rows beyond the two pairs of rows which have just been picked, the steering mechanisms are operated to pivot the wheels 90 degrees back to their former row-travel positions, and the hydraulic wheel drive motors are operated to cause the machine to travel back along the next four rows of trees. The drive motors can be operated in reverse if desired.

The operation of machines in pairs, and the use of a machine spanning two rows of trees, is purely for economic reasons. The invention can as well be embodied in a machine operating solo, or in a single-row machine.

For maximum efficiency of operation, a ground crew of four pickers will operate with each machine, picking from the ground up to the lowest level reached by the riding pickers, who will pick from that level up to the top of the tree. The ground pickers will pick into respective picker's bags which will be recurrently emptied into the hoppers H of the seated pickers nearest at hand, thus restricting the ground picker's walking movements to a range of four or five feet from his picking positions.

The operating personnel for a machine will normally include four riding pickers, four or more walking pickers, and a box or bin handler (e.g. one for two machines), controlling the delivery of fruit from the down conveyor G into boxes or bins on platform I and lifting the filled boxes or bins from the platform and setting them in the box row. In most cases the intermittent advancing travel of the machine can be controlled by one of the riding pickers, thus eliminating one man from each pair of machines.

The number of ground pickers may vary depending upon the extent to which the trees are loaded with fruit. Additional ground pickers may be utilized for picking heavily loaded trees.

DETAILED DESCRIPTION

*Operator's end frame A.*—(FIG. 7) comprises a pair of upwardly converging legs 30 joined at their upper ends by a transverse head platform 31 and connected at their lower ends by a transverse beam 32 joined thereto by steering spindle mount plates 33, thus defining an A-frame, corners of which are braced by upper gussets 34 and lower diagonal brace bars 35. An intermediate cross bar 36 bridges between and braces legs 30 at an intermediate height. Frame A includes the operator's cage O.

*Back end frame A'.*—(FIG. 8) with the exception of the omission of the operator's cage, is of construction similar to that of frame A, with corresponding parts designated by corresponding reference numerals.

Head platforms 31 of the respective frames project toward one another and are braced in each instance by upwardly and inwardly inclined braces 37 secured at their lower ends to intermediate cross bar 36.

*Bridge B.*—(FIGS. 7–10) comprise a pair of trusses 40 at each side of the bridge, extending full length of the machine, having tapered end portions 41 securely mounted upon the respective platforms 31, and embodying lower track rails 42 of inverted-T section (e.g. pairs of angle bars embracing vertical webs 43 and secured together). Webs 43 can be in the form of conventional truss structure and diagonal braces (the details of which are omitted for simplicity of illustration) for adequate bracing of the trusses. Trusses 40 are bridged and braced by longitudinally spaced transverse connecting arches 45 each including triangular side portions and a central transverse bridging bar 46. The respective ends of the bridge B are braced to the base portions of end frames A and A' by diagonal brace bars 47 extending from lower transverse frame bar 32 inwardly and upwardly and attached to connecting arches 45 near respective ends of the machine.

The pairs of longitudinal trusses 40 are spaced apart to provide a central space 48 (FIGS. 7 and 13) extending the full length of the machine for unobstructed longitudinal travel of the upper ends of elevator units E. Between the trusses 40 of each pair are respective longitudinal spaces accommodating the two units of the bridge conveyor mechanism C. The lower rails 42 of pairs of trusses 40 are transversely connected by cross bars 49 (FIG. 8) which support the conveyor mechanism.

*Bridge conveyor mechanism C.*—(FIGS. 12 and 13) comprises, at each side of the bridge, a conveyor trough 51 of rectangular channel section supported on cross bars 49 and extending substantially full length of the bridge. Each trough 51 has an apron 52 inclined upwardly and inwardly from the upper margin of its relatively shallow inward side wall and terminating in a low vertical lip 53, and has a vertical outer side wall 54 extending to a height somewhat above the lip 53, whereby fruit dropped upon the apron 52 and rolling into the trough 51 will be retained against any possibility of escape. Apron 52 is lined by a cushioning pad 55 of sponge rubber or equivalent material. An endless conveyor belt 56 operates in the rectangular channel portion 51 of the trough, its upper reach being supported in sliding bearing engagement with a false bottom 57 in the trough channel.

At respective ends of the machine (FIGS. 9, 17 and 25) conveyor belt 56 travels around respective pulleys 58, 59, the latter being a drive pulley. The upper stretch of the belt passes beneath an idler roller 60 at a position adjacent each of the pulleys 58, 59.

The upper stretches of conveyor belts 56 travel toward the operator end of the machine, where they pass beneath deflector baffles 61 (FIG. 17) at the ends of the respective troughs 51. The baffles 61 constitute the outer side walls of a Y-shaped delivery chute 62 which is inclined at a slight downward slope, just sufficient in pitch to cause the oranges or other fruit 63, handled by the machine, to roll into the upper end of down elevator G with which the discharge end of the chute 62 communicates. Belts 56 pass through slots 64 in baffles 61 (FIG. 18).

Belt pulleys 58, 59 are mounted for rotation in suitable bearings at respective ends of the bridge. The pulley 59 has its respective shaft (FIG. 25) provided with a sprocket or pulley which is driven by a chain or belt 65 from a lay shaft 66 traversing substantially the full width of the bridge at the operator end of the machine and providing a common drive for both units of bridge conveyor mechanism C.

An electric drive motor 67 driving a reduction gear unit 68, is suitably mounted on the head 31 of frame A, the output shaft of reduction gear 68 driving, through a chain or belt drive 69, to the lay shaft 66.

*Picker support booms D.*—(FIGS. 9, 13, 16) each comprise an open-work box frame structure comprising respective laterally spaced vertical side member 70 supporting between their front sides a transverse seat lift guide 71 extending from the lower end of the boom to a point near the upper end thereof. Referring now to FIGS. 13 and 16, the seat lift guide 71 includes transversely spaced vertical, opposed channels 74 functioning as guide tracks for the seat-lift carriage.

Boom D further includes a cross brace 75 connecting the lower ends of side members 70, on its forward side, and a cross head 77 at its upper end (FIG. 13) the head 77 having at respective sides thereof, upwardly extending clevices 78 which are suspended by pivots 79 from transverse equalizer beams 80 having, at their ends, upwardly extending roller bracket arms 81 provided with flange rollers 82 traveling on horizontal track flanges of the lower rails 42 of the bridge trusses 40. Thus the booms D are suspended for longitudinal travel along the bridge.

Defined between tracks 74 and in the housing of elevator E is a vertical slot 83 for delivery of fruit from the adjacent hopper unit into the elevator E of the respective boom.

*Seat lift boom D'.*—(FIG. 10) likewise comprises a vertical box frame structure comprising open work side members 70', laterally spaced and connected on its front side by a vertical seat guide track 71, the back side of this box frame being open. It has a transverse bottom frame 75' connecting its side members 70' and, at its upper end, a cross head 77' by means of which it is suspended for travel upon the bridge B by equalizer beams 80.

In some instances it may be desirable to utilize one of the picker elevator units D, E in lieu of the picker unit D', for some added volume of fruit handling.

Boom unit D' is distinguished from units D in having, in lieu of an elevator unit E, a hopper unit H' which includes free-fall arresting means and a collecting pouch hereinafter described in detail.

*Elevators E.*—(FIGS. 9, 12, 13) comprise respective housings 85 and 86 of rectangular tubular construction for the ascending and decending stretches, respectively, of an endless chain and bucket elevator 87. Housings 85 and 86 are connected at top and bottom by hoods 88. In the bends between the hoods and the vertical housings are respective shafts journalled in bearings 95 (fixed and adjustable) in the upper and lower ends of the housings. On the respective shafts are mounted respective upper pairs of sprockets 91 and 92, communicating with the upper ends of housings 85 and 86 respectively; and lower pairs of sprockets 93 and 94, communicating with the lower ends of housings 86 and 85 respectively. The chains of elevator 87 travel over the sprockets 91, 92, 93 and 94 in the order named. One of the sprocket shafts, at the upper end of each elevator and preferably at its back side (e.g. the shaft 96, FIG. 9) is a drive shaft, having a projecting end driven, by suitable drive 97, from an electric motor 98 which transmits power to the drive 97 through a reduction gear 99. The motor 98 may be mounted on the back side of one of the side frame members 70 or on top of the elevator unit E, in any suitable selected position.

The motors 98 draw power from the trolley power system P as hereinafter more fully described.

In the hood 88 (FIG. 13) in respective sides thereof, are laterally-opposed discharge windows 89, spanned by a foam rubber cushion padded double ramp 90 disposed between the pairs of upper sprockets 91, 92 in a position to receive the fruit which is discharged from the buckets of conveyor 87 as they are up-ended in passing around sprockets 91. As the fruit thus drops onto the ramp 90, it will divide and roll laterally in both directions through window 89 onto the apron pads 55 of the two units of bridge conveyor C, the outer ends of ramp 90 projecting beyond the sides of upper hood 88 and overhanging the lips 53 of the horizontal conveyor troughs.

*Picker's carriage F.*—(FIGS. 9, 12, 16) in each instance comprises a seat frame 100 mounted on a fork 101 disposed in a medial vertical longitudinal plane and connected by a king pin 102 to a knuckle bearing 103 to provide a vertical knuckle joint about which the seat 104, mounted on the frame 100, can be swung leftward or rightward by the picker seated therein, manipulating the seat manually by grasping tree braches and pulling to one side or the other. The seat 104 has a foot rest 105 on which is mounted control mechanisms 106 each comprising a pair of electric switches.

Knuckle bearing 103 is carried by a seat slide 107 (FIGS. 12 and 13) consisting of a rectangular slide head positioned in a vertical transverse plane, with rollers 108 at its four corners rolling within the guide channels 74. Each seat unit F is suspended from a respective lift unit L for elevating and lowering operation under the control of the picker.

*Hopper unit H.*—(FIGS. 9, 12, 16) in each of the picker boom D and D', comprises a funnel 110 disposed at the front side of the seat 104 and suitably supported by frame 100, a delivery trough or tube 111 extending rearwardly beneath the seat 104 with its axis inclined downwardly and rearwardly at a low angle just sufficient to insure rolling of the fruit therein, toward the lower end of respective elevator E at the forward side thereof, and provided with suitable means for delivering the fruit into the buckets of elevator 87 as they commence to move upwardly in the lower end of elevator housing 85, through the vertical slot 83 which is provided in the forward wall of housing 85 the full height of carriage tracks 74.

At the lower end of each elevator E there is provided a receiving chute 120 (FIG. 16) into which a ground picker may empty the picking bag which he carries. Chute 120 extends through a side member 70 of the respective boom, and into the space between the two vertical housings of elevator E. It has a laterally-directed outlet 121 at its inner end, communicating with a window 122 in the housing 85 on the ascending side of the elevator. The fruit delivered by outlet 121 will drop into the ascending elevator buckets and be elevated along with the fruit delivered through chute 111.

The delivery device can be in the form of a rigid tube 111, supported in fixed relation to a carriage frame 100 and terminating near the axis of knuckle 102 around which it swings arcuately, and depositing the fruit into a receiving hopper tray 112 mounted on the head 107 of carriage F just below the knuckle joint 102, 103. Tray 112 is arranged to deliver the fruit to elevator 87. Alternatively, the delivery means may comprise simply a flexible tube 111' exemplified in FIG. 10 in connection with the disclosure of picker's boom D', one end of the tube 111' being fixedly connected to receiving funnel 110 and its other end being fixed to a delivery spout 112' carried by the lower end of carriage slide 107. The flexibility of tube 111' is such as to accommodate the extent of arcuate swinging movement required of the seat frame, the tube flexing to permit its outer end to move with the funnel 110.

It will be understood that the fruit delivery devices of all of the units D and D' can be either of the type shown in FIG. 9 or the type shown in FIG. 10.

*Hopper unit H'.*—(FIGS. 10 and 11) comprises, in addition to the funnel 110 and delivery tube 111 or 111', a fruit receiving hopper box 114 having a plurality of flexible baffles 115 of heavy ribbon fabric webbing stretched under moderate tension transversely between opposite sides, to which these baffles are anchored, and disposed in staggered arrangement at respective levels so as to catch the fruit delivered from the delivery device 111 or 111', to cause the fruit to travel a tortuous path downwardly in the hopper box 114, and finally dropping the fruit a short distance downwardly onto a padded bottom 116. Bottom 116 is hinged at 117 along its rear margin and normally secured in closing relation to the bottom of box 114 by a latch 118 which is releasable so that the bottom 116 can be tilted downwardly as indicated in phantom to permit the fruit to roll out of the hopper box 114 into a receiving box or bin.

As the carriage units F, F' are raised and lowered in their respective booms D, D', the hopper trays 112 and delivery spout 112' will travel vertically in the slots 83 defined between track channels 74.

Hopper box 114 has its back side secured to the lower end of carriage slide head 107 and its forward side suspended from the upper side of the slide by a diagonal brace 119.

*Down conveyor G.*—(FIGS. 10, 17–21) comprises a vertically disposed housing 125 of rectangular tube construction having in its rear wall, near its upper end, a receiving window 126 with which the discharge end of chute 62 of the bridge conveyor communicates. An endless conveyor comprising laterally spaced conveyor chains 127 traveling around upper and lower sprockets 128, 129, and a series of buckets 130 supported between the chains 127, operates in the housing 125 with the buckets 130 opening upwardly while traveling downwardly in the rear side of the housing past to the window 126, receiving the fruit delivered from chute 62 and carrying it downwardly, the buckets tilting downwardly as they pass around the lower sprockets 129 and dropping the fruit into a receiving hopper box 131, and being inverted as they travel upwardly in the forward side of the housing. The upper end of the housing may be closed as indicated. Its lower end is in open communication with the open upper end of box 131.

Receiving hopper box 131 is generally similar to hopper box 114 of unit D', and embodies free fall-arresting baffles 132 similar in construction and operation to the baffles 115 of the box 114. At its lower end, hopper box 131 has a discharge mouth 133 to which is secured the open upper end of a fabric fruit collecting pouch 134. Pouch 134 has a discharge mouth 135 (FIG. 21) of slot form, in respective ends of which are secured hanger eyes 136 which are normally supported by hooks 137 on the rear wall of box 131, with the pouch 134 folded upwardly to provide a close bottom for the box 131 as shown in FIGS. 18, 19 and 20 (the latter showing the pouch in cross section).

In the operation of the machine, the fruit which is continuously being delivered to the down conveyor G from the bridge conveyor C will be lowered in the unit G and deposited in its hopper box 131. At proper intervals, a member of the ground crew will place a bin or box under the hopper box 131, will lift the elevated end of pouch 134 from the hooks 137 and lower it into the box or bin permitting the fruit to be discharged downwardly through the pouch mouth 135 as indicated in FIG. 21 until the box or bin is filled. The discharge of the fruit can be arrested at any time simply by folding the pouch 134 upwardly and again attaching it to the hooks 137.

The upper end of housing 125 projects upwardly through the head frame 31 of operator end frame A and is suspended therefrom by any suitable bracket connections to the frame 31, the details of such connection being omitted for clarity.

Drive to the down conveyor unit G (FIGS. 17 and 25) is provided for by a spur gear drive 138 from lay shaft 66 to a short counter shaft from which the drive is transmitted through a chain drive 139 to the shaft which carries and drives the upper sprockets 128 of the endless conveyor. Thus this conveyor is driven in coordinated relation to the bridge conveyor C, by the common drive motor 67.

*Box rack and conveyor I.*—(FIGS. 1, 7 and 10) comprises parallel frame bars 140 suitably connected by cross members 141, and conveyor rollers 142 having end trunnions journalled in the respective frame bars 140. The ends of the conveyor may be bent rearwardly to clear the travel wheels J as indicated in FIG. 1. Any suitable bracket means 143 may be utilized for mounting the conveyor to the lower portion of operator end frame A, as by suspending it from the lower cross frame member 32. The conveyor is supported in a horizontal plane at a suitable height from the ground (e.g. between two and three feet) such that the attending ground crew member can most easily lift therefrom the filled fruit boxes 145 which may be consecutively moved from beneath the down conveyor G to a discharge end of the conveyor R. As the machine slowly travels forward in its sidewise movement spanning the two tree rows, the empty boxes or bins will be placed on a receiving end of the conveyor I, the line of boxes or bins will be gradually moved beneath down conveyor G, filled therefrom, and then moved on to the discharge end of the conveyor where they will be removed by the ground crew and deposited in the box row R in which the operator end of the machine is traveling.

*Ground wheel units J.*—(FIGS. 7–10) comprise, in each instance, a suitable ground-engaging wheel 150 (e.g. equipped with a pneumatic tire) having an axle 151 journalled between the lower ends of the arms of a fork 152 which is provided with a steering spindle 153 journalled in a pillow block bearing 154 which is mounted to a respective face plate 33 of a respective end frame. A suitable load-carrying end thrust bearing 155 may be incorporated in the lower end of bearing 154. The vertical steering axes of spindles 153 pass through the centers of the wheels 150, intersecting the axes of axles 151.

*Steering units K.*—(FIGS. 7–10, 23, 24) one at each end of the machine, comprise, in each instance, a steering chain 160 trained around sprockets 161 which are secured to the respective steering forks 152 at the bases of the spindles 153; a hydraulic cylinder 162 (for the operator's end) and 162' (for the back end of the machine) each actuator being mounted with its ends supported on suitable brackets 163 carried by end frame lower cross member 32; a piston 164 slidable in each cylinder; and a piston rod 165 extending through and secured to the piston 164, extending through suitable packing glands 166 in the ends of the cylinder 162, and having at its respective ends, clevices 167 to which the ends of chain 160 are anchored. To the respective ends of cylinders 162, 162' are connected, by suitable couplings, hydraulic fluid lines 168, 168' respectively, for two-way feed of pressure fluid to one end of the cylinder while exhausting it from the other, and vice versa. The pair of hydraulic lines 168 connected to the steering unit K at the operator end of the machine extend directly upwardly upon the frame A at that end, to the pumping and control mechanism carried by that frame.

Hydraulic pumping and control mechanism for steering operation comprises (FIGS. 7 and 26) pumps 170 and 170' driven by an internal combustion engine 171, both carried by frame A; a pair of two-way valves 172, 172' to which fluid under pressure is delivered from pumps 170, 170' respectively through parallel delivery lines 173, 173'; each valve 172, 172' having dual outlets which are connected to respective pairs of actuator lines 168, 168' leading to actuators 162, 162'. Each valve further includes a drain outlet connected to a common drain line 174 for directing bypass fluid to a storage tank 175. Each valve is provided with an operating lever 176 by means of which it can be shifted to any one of three selective positions. For example, for valve 172, these positions are: (1) a neutral position in which both of its outlet ports are closed so that no fluid can flow in either of the lines 168, fluid being bypassed to drain outlet 174; (2) a "right turn" position in which fluid is directed through one of the outlet lines 168 to one end of the actuator 162 while return fluid from the other end of the actuator returns through the other line 168 to the valve and is thence vented to the drain line 174 for return to the tank 175; and (3) a "left turn" position in which the flow in the two lines 168 is reversed, the return fluid again being vented through the return line 174 to the tank. The same is true of valve 172' and actuator 162' which is controlled thereby.

The two steering units can be operated either in unison or individually at the will of the operator by utilizing the separate control levers 176.

*Ground travel drive mechanism.*—(FIGS. 8, 9, 22–24) comprises, for the drive wheels J respective fluid motors 180 (at the operator's end of the machine) and 180' (at the back end) which can be of the gear type, each being mounted on a respective bracket plate 181 secured to one of the arms of the respective steering fork 152; a reduction gear unit 182 mounted on an extended wing of plate 181 and driven from motor 180 by a reduction belt drive 183; a driven sprocket 184 on the wheel shaft 151; and a chain 185 driving from the output shaft 186 of the gear unit 182 to the sprocket 184. Shaft 186 traverses from one side of fork 152 to the other and is mounted, on the other side, in a bearing plate 187 similar to mounting plate 181.

The fluid motor 180 is supplied with pressure fluid through dual fluid lines 190, one of which is operative to direct fluid to the motor for operating it while the other line carries return fluid. In forward drive operation, the pressure fluid is delivered through one of the lines 190 while in reverse drive operation the other line carries the pressure fluid. Fluid motor 180' is similarly operated by pressure fluid supplied through dual fluid lines 190'.

Hydraulic pumping and control mechanism for the ground drive (FIGS. 7 and 26) includes a single suction, dual outlet pump 191 driven from engine 171, delivering fluid under pressure through two discharge lines 192 to a pair of valves 193, 193'; and an inlet line 194 (also providing an inlet to pumps 170, 170') drawing hydraulic fluid from the tank 175 to supply the pumps. From each valve 193, 193', the respective pairs of lines 190, 190' extend to the respective fluid motors 180, 180', one for driving the drive wheel at the operator end of the machine and the other for driving the drive wheel at the back end of the machine.

The drain line 174, which is common to all of the hydraulic power units, has branch connections to valves 193, 193' for returning to tank 175, oil used by hydraulic motors 180, 190' in lubrication of their bearings and internal operating parts. Only a very small proportion of the total flow from pump 191 is diverted through the lubrication channels of the pump and thence to drain line 174. The volume flow utilized in turning the motors 180, 181 is returned through one line in each pair of lines 190, 190', depending on whether the drive is forward or in reverse. Each valve 193, 193' has three control positions, namely, (1) forward drive, in which pressure fluid is delivered through one of the pair of lines 190 (or 190') while return flow is through the other line; (2) reverse drive, in which pressure and return flows are reversed in the pair of lines; and (3) neutral, in which flow is cut off and the motor is not driven.

*Seat carriage lifts L.*—(FIGS. 8, 9, 10, 25) comprise, in each instance, a lift cable or chain 200 the lower end of which is anchored to a bracket arm 199 on a respective slide head 107 at its upper end. Cable 200 is actuated by a lift gear 201 mounted on a bracket 202 carried by the cross-head 77 or 77' of the respective picker boom D, D', and powered by an electric motor 203 which draws current from the trolley system P under the control of the picker carried in the respective seat carriage unit F, whereby the picker may control the ascending and descending movements of his carriage unit F with respect to the tree being picked. The motor 203 is a reversible motor and is controlled by a two-way electric circuit, for ascending and descending movements, the seat unit F descending by gravity when the cable 290 is played out by the unit 201.

*Boom-transport mechanism M.*—(FIGS. 9, 10, 13, 25) comprises, in each instance, an electric motor 210 mounted on the cross head 77 or 77' of the respective boom D, D'; a reduction gear unit 211 driven by the motor 210 and having an output shaft 212; a counter shaft 213 journalled in pillow block bearings 214 which are mounted on the front side of the boom cross head 77 or 77', a countershaft 213 extending transversely the full width of the cross head (FIG. 13); a chain drive 215 transmitting drive from the reduction gear outlet shaft 212 to the countershaft 213; and chain drives 216 from the respective ends of countershaft 213 to respective inner forward flanged rollers 82 of the boom-suspension mechanism. The motor 210 is a reversible motor, drawing current from the trolley system P and controlled by a two-way circuit responsive to foot-switch actuation by the individual picker carried by the respective boom. Thus, it is possible for this picker to actuate his own boom horizontally for approaching and receding movements with respect to the tree on which he is working. Such horizontal movements of the boom can be coordinated with elevating and descending movements of his respective seat carriage by operation of his respective lift mechanism L, while limited lateral shifting of his seat can be effected by manually shifting it about its knuckle joint 102, 103 as previously described.

In order to avoid conflict between the several booms traveling lengthwise on the bridge B, the invention provides for limiting each boom to a range of movement along a proportional part of the length of the bridge B. To this end (FIG. 25) for each of the booms, a pair of limit switches 218, 219 are mounted on a track rail 42 in positions to be engaged by a roller bracket 81 and connected into the circuit of motor 210 so as to open the circuit at both limits of the travel range thus set for the respective boom.

*Operator's cage O.*—(FIGS. 7, 10) is carried by the end frame A and provides for the main operator an operator's platform 220 at a height such that the operator's head is substantially at the level of bridge conveyor C (above the tops of the trees being picked) and such that he can survey the overall operation of the machine and of the pickers riding thereon. A control console 221 (FIG. 26) upon which the hydraulic control valves 172, 172', 193, 193' are carried, is mounted in the frame A above the platform 220 for convenient access by the operator. Master switches 222 and indicator instruments 223 for the electric power circuits are likewise mounted on the console 221.

*Electric power supply system P.*—(FIGS. 2, 9, 13, 14, 25) comprises a pair of trolley wires 230 suspended under tension between adjustable anchorage units 231 carried at the upper ends of tripod or equivalent supports 232 mounted between the bridge trusses 40 at the respective ends of the bridge B. Trolley wheels 233 (FIGS. 13, 14) carried by trolley brackets 234 on the upper ends of respective booms D, D', are urged by spring loaded mountings 235 into engagement with the respective trolley wires 230, which provide respective sides of an electric power circuit. Power drawn from the trolley wires is carried to the several electric motors 98, 203 and 210 of each picker's boom by suitable multiple-circuit connections between the trolley wheels, the several motors, and the several control switches 106 of the respective seat unit F (each pair of switches providing for selective forward and reverse operation of a respective hoist motor 203 or longitudinal transport motor 210 of a unit M, respectively). The switch controlled circuits may be confined to the circuits of motors 203 and 210 which provide for direct picker-control of the movements of seat carriage units F; whereas the motors 98 may be connected directly to the trolley wheels 233 without intervening switch control and thus will be under the control of the master switches 223 of the control console 221.

It may now be noted that each of the booms D, D' draws its electric power from the trolley wires 230 as it travels lengthwise of the bridge B in its limited range of movement, and that its motorized operations are therefore independent of those of the other booms.

Power for the electrical system is provided by a generator 236 mounted on the back frame A' (FIG. 8) and driven by an internal combustion motor 237. Suitable connections are provided to carry the power from the generator 236 to the trolley wires 230. Since the circuits are conventional and can be readily determined from the foregoing information, by any skilled electrician, they are not disclosed herein.

The operation of the machine has been described in a general way following the general description at the beginning of this specification, and detailed aspects thereof are described in connection with the detailed description of the components. References made to such preceding description for an understanding of the operation of the machine.

The modified form of the machine shown in FIG. 27 is of the same construction and operation as the picker's machine shown in FIGS. 1–26 with the exception that it does not incorporate any of the fruit conveyor units. This simplified form of the machine may be utilized for pruning, spraying, dusting and other operations on orchard trees with the exception of fruit picking, for which it is not adapted. Like parts in the respective machines are indicated by like reference letters.

As used for pruning, spraying etc., the invention has the particular advantage of making it possible to utilize air-operated tools (e.g. pruning spray etc., tools) which, in attempts to use them on the ground, have proven to be impractical because the air hoses, lying on the ground, have become fouled by the cuttings pruned from the trees and thrown to the ground by the workers. In the use of the present machine for such operations, the air hoses will be carried by the machine and in this connection it is contemplated that a motor driven compressor will be incorporated in the machine to supply the compressed air for operation of such tools.

The invention further contemplates the possibility of utilizing electronic or mechanical fruit selector and picker devices instead of human operators, and it is to be understood that where the word "picker" is used herein, it is intended to be broad enough to embrace either human pickers or mechanical or electronic pickers.

What is claimed is:

1. In a mobile fruit delivery and picker apparatus, in combination: a gantry frame including an overhead bridge beam for spanning the trees of an orchard row, a pair of end supports carrying said beam, and ground-travel means carrying the respective end supports for travel of the apparatus in a path transverse to said bridge beam with the latter spanning a tree row; picker support carriages each having means suspending the same from said bridge beam, extending downwardly between tree rows and movable longitudinally along said beam for effecting movement of the carriage horizontally toward and from a tree; an overhead conveyor extending along said bridge beam, for conveying fruit longitudinally of the frame to a gathering point; elevator conveyors extending from at least some of said picker support carriages to said overhead conveyor, for elevating freshly picked fruit thereto, said elevator conveyors being supported by the respective carriage-suspending means and movable horizontally with the respective carriages; and means on the frame at said gathering point for gathering the fruit delivered by the overhead conveyor and depositing it in a receptacle.

2. Apparatus as defined in claim 1, wherein said gathering point is located at one end of the frame.

3. Apparatus as defined in claim 1, wherein each of the last mentioned picker support carriages comprises a seat having a fruit-receiving hopper positioned to receive fruit as it is picked by a picker reposing in the seat, and a chute for gravity delivery of fruit from the hopper to the respective elevator.

4. In a mobile fruit delivery and picker transport apparatus, in combination: a gantry frame including an overhead bridge beam for spanning the trees of an orchard row, a pair of end supports carrying said beam, and ground-travel means carrying the respective end supports for travel of the apparatus in a path transverse to said bridge beam with the latter spanning a tree row; rolling supports mounted for horizontal travel upon said bridge beam longitudinally thereof; picker support carriages suspended from the respective rolling supports beneath said bridge beam for longitudinal movement toward and from a tree; an overhead conveyor extending along said bridge beam, for conveying fruit longitudinally of said bridge beam; elevator conveyors carried by the respective rolling supports and extending from at least some of said picker support carriages to said overhead conveyor, for elevating freshly picked fruit thereto; and means for gathering the fruit delivered by said overhead conveyor and depositing it in a receptacle.

5. Apparatus as defined in claim 4, including, for each of said elevator conveyors, a transfer chute carried by a respective rolling support and extending from beneath an upper portion of a respective elevator conveyor to receive fruit dropped by the respective elevator conveyor during turnover from upwad to downward movement thereof, and inclined downwardly and transversely over said overhead conveyor to deliver fruit thereon.

6. Apparatus as defined in claim 5, wherein there are two of said bridge beams separated by a space extending longitudinally between them; wherein there is one of said overhead conveyors traveling along each of said bridge beams and wherein, for each of said elevating conveyors there are two of said transfer chutes extending downwardly and outwardly in opposite directions to divide the delivery of fruit from the upper end of the respective elevating conveyor and to deliver it to both of said overhead conveyors.

7. In a mobile fruit delivery and picker transport apparatus, in combination: a gantry frame including an overhead bridge beam, said bridge beam having respective pulley tracks along respective sides thereof, a pair of end supports carrying said bridge beam, and ground travel means carrying the respective end supports for travel of the apparatus in a path transverse to said bridge beam with the latter spanning an orchard row; picker support carriages suspended from said bridge beam, an overhead conveyor extending along said bridge beam for conveying fruit longitudinally thereof; elevating conveyors extending from at least some of said picker support carriages to said overhead conveyor, for elevating freshly picked fruit; each of said elevating conveyors including a frame having at its upper end travel pulleys rolling upon said tracks for travel of the respective elevating conveyors longitudinally along said bridge beam, and means for gathering the fruit delivered by said overhead conveyor and depositing it in a receptacle.

8. Apparatus as defined in claim 7, wherein there are two of said bridge beams spaced apart to define a longitudinally extending space between them, wherein said bridge beams having respective pulley tracks along their respective outer sides, and wherein each of said elevating conveyors includes a frame having at its upper end travel pulleys rolling upon said tracks for travel of the respective elevating conveyors longitudinally along said bridge beams; and drive motors for driving at least some of said rollers to effect power driven movement of said elevating conveyors along said bridge beams.

9. In a mobile fruit delivery and picker transport apparatus, in combination: a gantry frame including an overhead bridge beam for spanning the trees of an orchard row, a pair of end supports carrying said beam, and ground-travel means carrying the respective end supports for travel of the apparatus in a path transverse to said bridge beam with the latter spanning a tree row; picker support carriages suspended from said bridge beam; an overhead conveyor extending along said bridge beam, for conveying fruit to a gathering point, elevator conveyors extending from at least some of said picker support carriages to said overhead conveyor, for elevating freshly picked fruit thereto; and means carried by the frame at said gathering point for gathering the fruit delivered by said overhead conveyor and depositing it in a receptacle, said last means comprising a descending conveyor and free-fall-retarding means into which the fruit is dropped by said descending conveyor.

10. In a mobile fruit delivery and picker transport apparatus, in combination: a gantry frame including an overhead bridge beam for spanning the trees of an orchard row, a pair of end supports carrying said beam, and ground-travel means carrying the respective end supports for travel of the apparatus in a path transverse to said bridge beam with the latter spanning a tree row; picker support carriages suspended from said bridge beam; an overhead conveyor extending along said bridge beam, for conveying fruit longitudinally of said bridge beam; elevator conveyors extending from at least some of said picker support carriages to said overhead conveyor, for elevating freshly picked fruit thereto; and means for gathering the fruit delivered by said overhead conveyor and depositing it in a receptacle; said gathering means comprising a vertically disposed endless bucket conveyor including a tubular vertical housing, and a receiving hopper at the lower end of said tubular housing.

11. In a mobile fruit delivery and picker transport apparatus, in combination: a gantry frame including an overhead bridge beam for spanning the trees of an orchard row, a pair of end supports carrying said beam, and ground-travel means carrying the respective end supports for travel of the apparatus in a path transverse to said bridge beam with the latter spanning a tree row; rolling supports mounted for horizontal travel upon said bridge beam longitudinally thereof, picker support booms carried by the respective rolling supports and extending downwardly therefrom; elevating conveyors extending vertically along the respective booms for elevating freshly-picked fruit to the level of said bridge beam; picker support carriages guided by the respective booms for vertical movements alongside said elevating conveyors; means for elevating and lowering said carriages; said elevating conveyors providing for access thereto for direct delivery of fruit thereto by a picker at all elevations of said carriage; an overhead conveyor extending along said bridge beam for conveying fruit longitudinally thereof, the upper ends of said elevating conveyors being movable horizontally along said overhead conveyor and having means for delivery of the elevated fruit thereto in all positions of horizontal travel of the respective rolling supports; and means for gathering the fruit delivered by said overhead conveyor and depositing it in a receptacle.

References Cited by the Examiner
UNITED STATES PATENTS
2,708,998 5/1955 Ulinski.

GERALD M. FORLENZA, *Primary Examiner.*
A. J. MAKAY, *Assistant Examiner.*